July 19, 1927.

C. W. TAYLOR

PULLEY

Filed Jan. 2, 1926

1,636,492

C. W. Taylor
INVENTOR

By: Marks & Clerk
ATTYS

Patented July 19, 1927.

1,636,492

UNITED STATES PATENT OFFICE.

CHARLES WILLIAM TAYLOR, OF HENDON, LONDON, ENGLAND.

PULLEY.

Application filed January 2, 1926. Serial No. 78,882.

The invention relates to pulleys which are used for transmitting power either by frictional contact with one another or by means of bands, belts or the like.

With pulleys having surfaces of wood or metal a certain amount of slip occurs between the contact surfaces with the resulting disadvantage of a waste of power and consequent loss of efficiency.

In order to overcome these disadvantages, the invention consists in the combinations of elements hereinafter described and particularly pointed out in the claims.

Referring to the accompanying drawings:—

Figure 1:
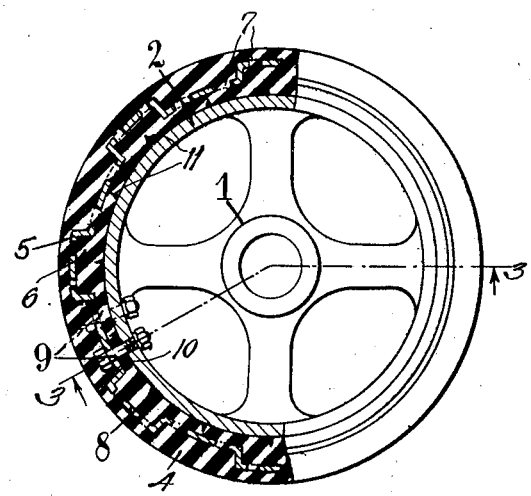
Figure 2:
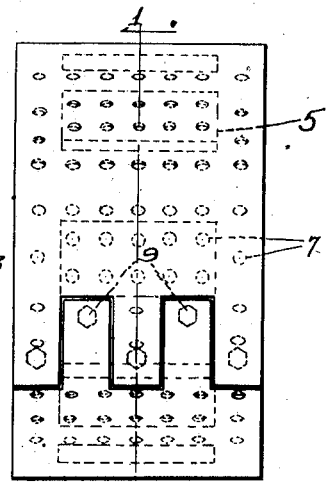
Figure 3:
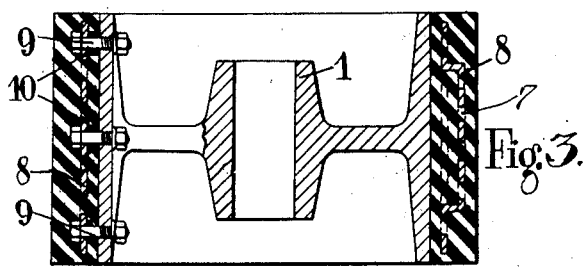

Figure 1 shows a section on the line 1—1 of Figure 2 of one form of non-slip cover in place of a pulley, Figure 2 being a side elevation showing a method of jointing the juxtaposed ends of the cover, and Figure 3 a section on the line 3—3 of Figure 1.

Referring to the figures which illustrate a typical form of the invention, the foundation, 8, of sheet-metal strip is provided with a number of transversely-disposed projections, 5, on the outside and with corresponding recesses, 6, on the inside to form a support for the driving material, 4. The whole strip is covered on both sides with resilient or semi-resilient material, 4, which is attached by suitable means, the material on the two sides integrally uniting through the holes, 7, which are provided for the purpose.

The protuberances give additional support to the material, 4, and co-operate with the holes or apertures in preventing the material from being torn off or creeping on the foundation. They form in fact an anti-creep foundation.

The apertures, 7, in the protuberances may be of any shape but should be so formed that they do not shear the material when it is subjected to stress.

This foundation with its covering is then wrapped round the periphery, 2, of the pulley, 1, and secured to it by means of bolts or the like, 9, or other anti-creep means, thus forming a loose cover having a non-slipping driving surface for securing to the periphery of any pulley. The two ends may be checked into one another as shown in Figure 2.

The foundation, 8, together with its covering of resilient or semi-resilient material when made separate for attachment to a pulley may be shaped or moulded in a circular form so that it will just fit on to the pulley or it may be made as a flat strip and then wrapped around the pulley. In the latter case the resilient or semi-resilient material which comes in contact with the periphery of the pulley is provided with grooves or slits 11 (see Fig. 1) to facilitate bending around the pulley when attached thereto. The provision of resilient or semi-resilient material on the inner surface of the foundation making contact with the periphery of the pulley acts as a gripping medium when under the pull of the driving belt to prevent creeping.

When bolts are used I prefer to place a washer, 10, as shown in Figures 1 and 3, around the bolt, 9, between the foundation, 8, and the periphery, 2, so that the metal foundation may be bolted down tight upon the washer, thus preventing the material, 4, being strained and at the same time holding the bolt from movement in the hole, thus avoiding friction and wear on the side of the bolt.

The resilient material, 4, may be rubber, asbestos, cork, fibre or the like or a mixture of such substances which will provide a surface having a high co-efficient of friction between it and the belt or the like so as to give a non-slipping drive. The material may be attached to the foundation by any suitable adhesive means such as cement, heat treatment or the like. In the case of rubber or mixtures of rubber, it is moulded round the foundation and integrally attached by means of vulcanizing.

The invention may be applied to stepped cone pulleys in which case each pulley may be provided with a separate cover.

Having now described my invention, what I claim as new and desire to secure by Letters Patent is:—

1. As a new article of manufacture, a non-slip cover for a belt pulley comprising a flexible sheet-metal strip having apertures therethrough and having also a plurality of spaced protuberances disposed transversely of said strip together with a continuous surfacing of resilient material attached to both sides of said strip to unite integrally through the apertures therein and embed said protuberances.

2. As a new article of manufacture, a non-slip cover for a belt pulley comprising a flexible sheet-metal strip having a plurality of spaced elongated protuberances disposed transversely of said strip and apertured through the thickness thereof together with a continuous surfacing of resilient material attached to both sides of said strip to embed said protuberances and unite integrally through the apertures therein.

3. As a new article of manufacture, a non-slip cover for a belt pulley comprising a flexible sheet-metal strip having apertures therethrough and having also a plurality of spaced elongated protuberances disposed transversely of said strip and on the same side thereof together with a continuous surfacing of resilient material attached to both sides of said strip to unite integrally through the apertures therein and embed said protuberances.

4. As a new article of manufacture, a non-slip cover for a belt pulley comprising a flexible sheet-metal strip having formed thereon a plurality of spaced protuberances on one side of said strip with congruent depressions on the other side thereof, said protuberances and depressions being disposed transversely of said strip together with a continuous surfacing of resilient material attached to both sides of said strip to unite integrally through the apertures thereof, embed said protuberances and fill said depressions.

In testimony whereof I have signed my name to this specification.

CHARLES WILLIAM TAYLOR.